June 1, 1937.  W. W. RIEDEL  2,082,552

SHOCK ABSORBER

Filed Jan. 30, 1936

INVENTOR
WALTER W. RIEDEL
BY
Spencer, Hardman and Fehr
ATTORNEYS

Patented June 1, 1937

2,082,552

UNITED STATES PATENT OFFICE 2,082,552

SHOCK ABSORBER

Walter W. Riedel, Dayton, Ohio, assignor to General Motors Corporation, Detroit, Mich., a corporation of Delaware Application January 30, 1936, Serial No. 61,446

12 Claims. (Cl. 267—8)

This invention relates to improvements in hydraulic shock absorbers.

It is among the objects of the present invention to provide a hydraulic shock absorber with an automatic control device adapted to adjust the shock absorber to vary its resistance to movements of the body and axle of the vehicle in accordance with the nature of the roadbed over which the vehicle is being operated.

A further object of the present invention is to provide a shock absorber adapted to resist slight relative movements between the body and axle of a vehicle as well as the more extensive movements thereof.

These and other objects of the present invention are attained by providing a shock absorber, having a fluid displacement chamber and an outlet port therefor, with a valve for controlling the flow of fluid through said port, this valve being adapted to be actuated by an inertia weight, movably supported within the shock absorber, in accordance with accelerations in the movements of the shock absorber in one direction. A toggle joint is provided in the shock absorber, connected with the weight, said toggle joint being adapted to multiply the effect of the weight to adjust said valve into positions in which it increasedly restricts the fluid flow from the port. A spring is interposed between the valve and the toggle joint for yieldably urging the valve away from the toggle joint and into its normal position in which it closes the port.

Further objects and advantages of the present invention will be apparent from the following description, reference being had to the accompanying drawing, wherein a preferred embodiment of the invention is clearly shown.

Figure 1:
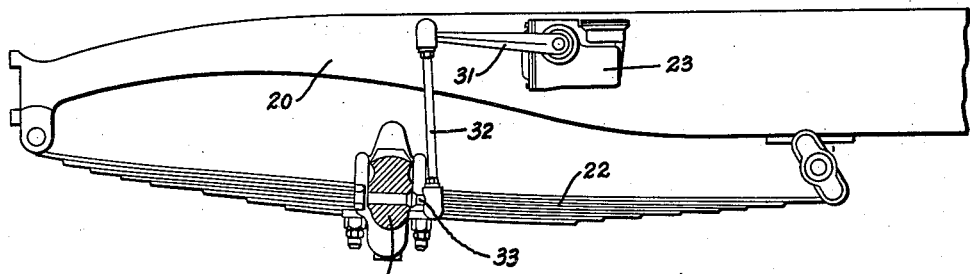
Fig. 1 is a fragmentary side view of the vehicle chassis, a shock absorber equipped with the present invention being shown applied thereto.

Referring to the drawing, the numeral 20 designates the frame of the vehicle, which is supported upon the vehicle axle 21 by vehicle springs 22, only one of which is shown. For the sake of clearness the roadwheels of the vehicle are omitted from this view.

The shock absorber comprises a casing 23, providing a fluid reservoir 24 and a cylinder 25. This cylinder is in communication with the reservoir through connected passages 26 and 27.

A rocker shaft 30 is journalled transversely of the shock absorber housing, one end of said rocker shaft extending to the outside of the housing and having the shock absorber operating arm 31 attached thereto. The free end of this arm has one end of a link 32 connected thereto, the opposite end of the link being anchored to the axle 21 of the vehicle as at 33. Within the shock absorber an operating cam 34 is secured to the rocker shaft 30, this arm engaging a piston 40 slidably carried within the cylinder 25. A spring 41, interposed between the bottom end of the cylinder 25 and the piston, maintains the piston in engagement with the operating cam 34.

Piston 40 has a passage 45 providing for the transfer of fluid from one side of the piston to the other. An annular valve seat 46 surrounds the passage 45 and is adapted to be engaged by the intake valve 47, this valve being urged normally to engage the seat 46 by the spring 48 interposed between the valve and a cage member 49. This cage member is maintained in contact with the interior surface of the head of piston 40 by the spring 41. A central passage in valve 47 is normally maintained closed by the pressure release valve 50 urged into engagement with the one surface of the intake valve 47 by a spring 51, one end of which engages the intake valve 47, the other an abutment collar 52 secured to the stem portion of the valve 50.

The passage 27, in communication with the interior of the cylinder 25 through passage 26, is also provided with an annular ridge 60 forming a valve-seat adapted to be engaged by the static valve 61, side openings 62 in the casing providing for fluid flow from the valve 61 after it has been moved from its seat 60.

Figure 2:
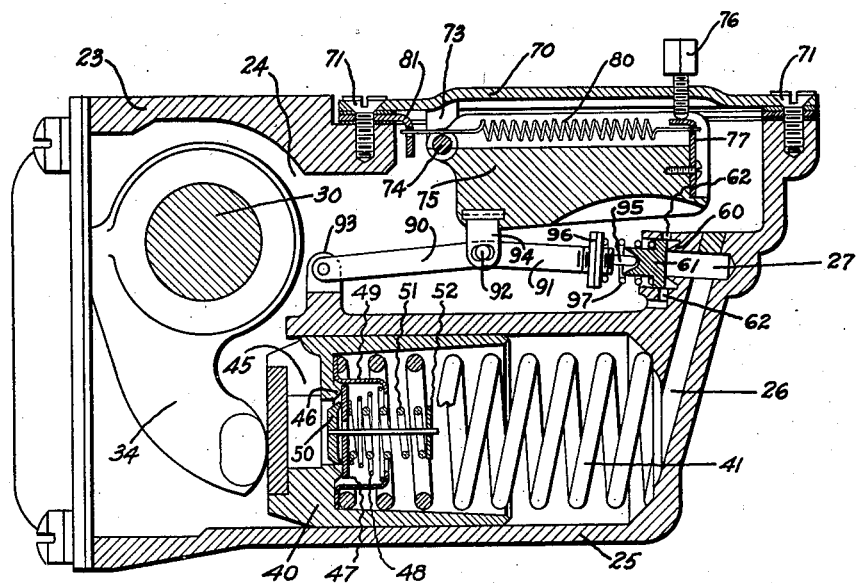
Fig. 2 is a longitudinal sectional view taken through the center of the shock absorber.
Figure 3:
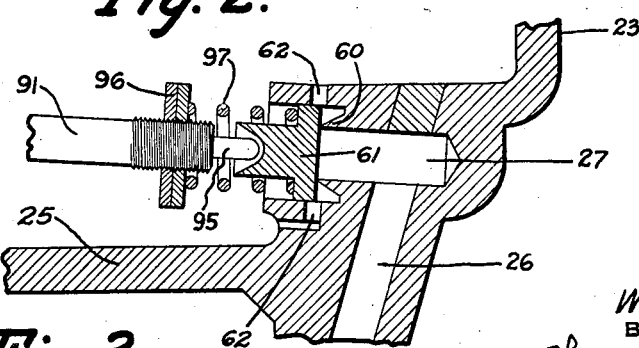
Fig. 3 is an enlarged fragmentary sectional view showing the inertia weight actuated valve and its spring.

A cover plate 70 is secured to the shock absorber casing by screws 71. This cover plate has a depending ear 73 carrying a pin 74 upon which the inertia mass or weight 75 is pivotally supported. A screw 76 threadedly carried by the cover 70 provides an adjustable stop for the inertia weight 75, a bracket 77, secured to said weight, being adapted to engage with screw 76. A spring 80 is interposed between bracket 77 on the weight 75 and a similar bracket 81 clamped between the cover 70 and the shock absorber casing. This spring yieldably maintains the weight 75 in normal position as shown in Fig. 2, in which position bracket 77 engages screw 76.

A toggle joint comprising links 90 and 91 hingedly secured together by the pivot pin 92 is provided in the shock absorber, the one end of link 90 being pivotally secured to an ear 93 formed on the cylinder portion 25 of the shock absorber. A member 94 attached to the weight engages the pivot pin 92 of the toggle joint whereby the toggle joint is operatively connected with the weight 75. A reduced end 95 of the toggle link 91 extends into the recessed, outer end of the valve 61. Two washers 96 are threaded upon the link 91 of the toggle, forming one abutment for the spring 97 which also engages the valve 61 normally urging it away from the end 95 of the link 91 and into engagement with the valve-seat 60 normally to close the port formed by the passage 27 in communication with the interior of the cylinder 25.

The shock absorber just described functions in the following manner:

Supposing a roadwheel of the vehicle strikes an obstruction in the roadbed, causing the axle 21 to be thrust upwardly toward the frame 20. This results in a clockwise movement of the arm 31 and a similar movement of the operating cam 34. As the cam 34 rotates clockwise within the shock absorber, spring 41 tends to urge piston 40 to follow the movement of cam 34, resulting in a movement of the piston toward the left as regards Fig. 2. Under these circumstances fluid will move valve 47 from engagement with its seat 46 to establish a substantillay free flow of fluid from the reservoir 24 through the piston passage 45 into the interior of the cylinder 25. When the axle 21 is moved away from the frame 20, due to the return of the spring 21 to its normal load position, the reverse movement of the shock absorber obtains, resulting in a movement of the arm 31 and cam 34 counter-clockwise and piston 40 toward the right as regards Fig. 2. Now pressure is exerted upon the fluid within the cylinder 25, which pressure, when attaining a predetermined value, will urge valve 61 from its seat 60 against the effect of spring 97, thus establishing a restricted flow of fluid past the valve 61 through the side openings 62 into the reservoir. This restriction to the fluid flow causes the shock absorber to provide resistance to the movement of the axle 21 away from frame 20. If valve 61 cannot properly relieve excessive pressures created within the cylinder 25 by movement of the piston 40 toward the right, then valve 50 is moved from its engagement with valve 47 against the effect of spring 51 to establish an additional flow of fluid from the cylinder 25 through the central passage of valve 47 and out through the piston passage 45 into the reservoir 24.

Now supposing the vehicle frame 20 is moving upwardly away from the axle 21 at an accelerated rate, causing counterclockwise rotation of the arm 31 and cam 34 and a movement of the piston 40 toward the right. Naturally pressure within the cylinder 25, when attaining a proper value, will move valve 61 from its seat to establish a restricted flow of fluid from the cylinder 25 through passages 26 and 27 past the valve 61 into the reservoir. This restriction being substantially low, due to the comparative lightness of spring 96, may not properly restrict the fluid flow to control the accelerative upward movement of the vehicle body. To provide proper control under these circumstances, applicant provides an inertia weight which, due to its inertia, moves relatively to the shock absorber casing in response to such accelerative upward movement of the vehicle frame to which the casing is attached, this movement being clockwise as regards Fig. 2. As the weight 75 moves clockwise, it will move the toggle links 90 and 91 toward their aligned position, thus causing the link end 95 to exert pressure upon the valve 61 and move it toward its seat 60. It will of course be understood that valve 61 will engage the end 95 of toggle link 91 when moved by fluid pressure from the cylinder 25 from engagement with its seat 60. The weight 75 is moved downwardly, or more specifically, clockwise, proportionately to the acceleration of the upward movement of the shock absorber casing and consequently will urge valve 61 to increase its restriction to the fluid flow from passage 27 proportionately to such acceleration.

The washers or collars 96 threaded upon the link 91 of the toggle provide an adjustable abutment for one end of the spring 97 whereby the static load upon the valve 61 may be varied to meet desired conditions.

From the aforegoing description it may be seen that applicant has provided a shock absorber capable of automatically adjusting itself in accordance with the nature of the roadbed over which the vehicle is being operated. The shock absorber is also equipped with a spring-loaded static valve adapted to provide initial restriction to fluid flow whereby the shock absorber will resist slight movements between the axle and frame of the vehicle. This resistance, however, is automatically increased proportionately with accelerative movements of the shock absorber in one direction by the inertia weight provided in the shock absorber.

Due to the provision of the toggle joint, a small inertia mass may be used to actuate the valve 61 against the comparatively high pressures acting directly upon said valve. Without the provision of the toggle joint a comparatively larger weight would be required to actuate the valve 61 against this comparatively high fluid pressure.

Another feature of applicant's device is the provision of a spring which yieldably urges the valve 61 upon its seat whereby to provide initial restriction to fluid flow, necessitating a predetermined pressure to be built up within the shock absorber cylinder 25 before fluid flow is permitted therefrom.

While the embodiment of the present invention constitutes a preferred form, it is to be understood that other forms might be provided, all coming within the scope of the claims which follow.

What is claimed is as follows:

1. In a hydraulic shock absorber having a fluid displacement chamber provided with an outlet port, the combination with a valve for controlling the flow of fluid from said port; an inertia weight; a toggle joint adapted to be actuated by the weight to adjust said valve to increase its restriction to the fluid flow from said port; and resilient means interposed between the valve and toggle joint, yieldably urging said valve to close the port.

2. In a hydraulic shock absorber having a fluid displacement chamber provided with an outlet port, the combination with a valve for controlling the flow of fluid from said port; of an inertia weight; a toggle joint normally disengaged from the valve and adapted to be actuated by the weight to adjust the valve to increase its restriction to fluid flow from said port;

and resilient means interposed between the valve and toggle joint, yieldably urging the valve away from the joint and in port closing position.

3. In a hydraulic shock absorber having a fluid displacement chamber provided with an outlet port, the combination with a valve for controlling the flow of fluid from said port; of an inertia weight; levers hingedly secured together, movable by the weight to adjust the valve, and adapted to multiply the force of the weight against the valve to overcome the fluid pressure tending to move the valve to open the port; and a spring interposed between the levers and valve and yieldably urging said valve away from said levers and toward the port to close it.

4. In a hydraulic shock absorber having a fluid displacement chamber provided with an outlet port, the combination with a valve for controlling the flow of fluid from said port; of an inertia weight movably supported in the shock absorber; a toggle joint interposed between the weight and valve and adapted to multiply the force of the weight acting to urge the valve to increase its restriction to the flow of fluid from the port; and a spring interposed between the toggle and valve, yieldably urging the valve to close the port.

5. In a hydraulic shock absorber having a fluid displacement chamber provided with an outlet port, the combination with a valve for controlling the flow of fluid from said port; of an inertia weight pivotally supported within the shock absorber; an adjustable stop; a spring urging the weight against the stop; and mechanical force multiplying means interposed between the valve and weight, adapted to adjust the valve against the pressure of fluid acting upon it; and a spring interposed between said means and valve yieldably urging the valve to close the port.

6. In a hydraulic shock absorber having a fluid displacement chamber provided with an outlet port, the combination with a valve for controlling the flow of fluid from said port; of an inertia weight movably supported in the shock absorber; a mechanical force multiplying means attached to the weight and adapted to be engaged by the valve to limit its port opening movement, said means being adapted also to urge the valve toward the port against the effect of the fluid pressure acting upon it, in response to movement of the weight relative to the shock absorber; and resilient means yieldably restricting the movement of the valve from port closing position into the mechanical force multiplying means engaging position.

7. In a hydraulic shock absorber having a displacement chamber provided with an outlet port, the combination with an inertia weight; mechanical force multiplying means interposed between the weight and valve adapted to limit the port opening movement of the valve and also adapted to urge the valve to close the port in response to accelerations in the movement of the shock absorber upwardly; and resilient means interposed between the first mentioned means and the valve, yieldably urging the valve to close the port and resisting the movement of the valve toward said first mentioned means.

8. In a hydraulic shock absorber having a displacement chamber provided with an outlet port, the combination with an inertia weight; a toggle joint connected to the weight and adapted to limit the movement of the valve to open the port, said weight acting through said toggle joint to adjust the valve against the fluid pressure acting upon it to open the port, for restricting the flow of fluid from the port proportionately to the accelerations in the upward movement of the shock absorber; and a spring supported by the toggle and engaging the valve, yieldably urging it away from the toggle and toward the port to close it.

9. In a hydraulic shock absorber having a displacement chamber provided with an outlet port, the combination with an inertia weight; a toggle joint, the outer end of one link of which is pivotally secured to the shock absorber, the outer end of the other link being adapted to engage the valve to control the opening of the port; means secured to the weight engaging the pivotal connection between the two toggle links; and a spring, one end of which abuts the link more adjacent the valve, the other end engaging said valve, said spring yieldably separating the link and valve and urging the valve to close the port.

10. In a hydraulic shock absorber having a fluid displacement chamber provided with an outlet port, the combination with a valve for controlling the flow of fluid from said port; of an inertia weight pivotally supported within the shock absorber; an adjustable stop; a spring normally holding the weight against the stop, a toggle joint comprising two links hinged together, the outer end of one link being pivotally secured to the shock absorber, the outer end of the other link being adapted to engage the valve; means securing the hinged connection of the two links with the weight; and a spring interposed between the toggle link and valve yieldably urging said valve away from said link and into port closing position.

11. In a hydraulic shock absorber having a fluid displacement chamber provided with an outlet port, the combination with a valve for controlling the flow of fluid from said port; an intertia weight; force multiplying means adapted to be actuated by the weight to adjust the valve against the effect of fluid pressure thereon; a spring normally, yieldably urging said valve into port closing position; and means adjustably carried by the force multiplying means providing an abutment for the spring which may be shifted to vary the effective pressure of the spring upon the valve.

12. In a hydraulic shock absorber having a fluid displacement chamber provided with an outlet port, the combination with a valve for controlling the flow of fluid from said port; an inertia weight; a toggle joint adapted to be actuated by the weight to adjust the valve; an abutment collar adjustably secured to a link of the toggle; and a spring interposed between the collar and valve and yieldably urging the latter normally to close the port.

WALTER W. RIEDEL.